United States Patent [19]
Mund et al.

[11] 3,784,412
[45] Jan. 8, 1974

[54] METHOD FOR THE MANUFACTURE OF POWDERED TUNGSTEN CONTAINING ELECTRODE MATERIAL

[75] Inventors: Konrad Mund; Gerhard Richter; Magdalena Wenzel, all of Erlangen, Germany

[73] Assignee: Siemens Aktiengesellschaft, Erlangen, Munchen, Germany

[22] Filed: Feb. 17, 1972

[21] Appl. No.: 227,309

[30] Foreign Application Priority Data
Feb. 22, 1971 Germany............................ 2108457

[52] U.S. Cl................. 136/122, 252/422, 252/439, 252/443, 264/29
[51] Int. Cl. .......................................... H01m 13/04
[58] Field of Search........................... 136/121, 122; 252/422, 439, 443; 423/561, 440; 264/29

[56] References Cited
UNITED STATES PATENTS
3,379,647　4/1968　Smudski............................ 264/29 X
3,573,988　4/1971　McKee et al. ............ 136/120 FC X

*Primary Examiner*—L. Dewayne Rutledge
*Assistant Examiner*—M. J. Andrews
*Attorney*—Arthur E. Wilfond et al.

[57] ABSTRACT

Method for making electrode material containing tungsten in powdered form. A tungsten compound selected from a halide or oxide, a tungstic acid, a tungstate, a thiotungstate is mixed with a solid or liquid cokable substance. A solution of such organic substance may also be used. The organic substance in the mixture is precoked and the tungsten carburized or sulfidized.

18 Claims, No Drawings

METHOD FOR THE MANUFACTURE OF POWDERED TUNGSTEN CONTAINING ELECTRODE MATERIAL

The invention relates to a method for the manufacture of electrode material in powder form containing tungsten for electrochemical cells, particularly fuel cells.

It is known to use tungsten carbide and tungsten disulfide as the catalyst for the anodic oxidation of fuels, for instance, hydrogen, in fuel cells with an acid electrolyte. Tungsten carbide, WC, can be manufactured, for instance, by carburization of metallic tungsten with carbon or lamp black or with carbonaceous gases, such as carbon monoxide or methane, at temperatures above 700°C. For the manufacture of gas electrodes containing tungsten carbide, WC powder can be mixed with polymers and pore forming materials or with porous additives, such as activated charcoal and pressed at either cold or at elevated temperature. Tungsten disulfide, $WS_2$, can be manufactured by thermal treatment of ammonium thiotungstate under a protective gas. As the electric conductivity of $WS_2$ is low, in order to obtain sufficient conductivity, to manufacture porous gas diffusion electrodes made from $WS_2$, carbon powder is admixed to the catalyst ($WS_2$) together with polyethylene as a binder followed by subsequent pressing and sintering. For the manufacture of electrodes, thiotungstate can also be adsorbed on activated charcoal and subsequently reacted with acid to form trisulfide, which is converted to disulfide by a thermal treatment. The carbon carrier with the $WS_2$ is then pressed with a binder into electrodes and sintered at 150°C in an argon-hydrogen atmosphere.

Difficulties are encountered in the manufacture of unbonded electrodes which contain the electrode or catalyst material in powder form. In the preparation of tungsten carbide from tungstic acid through reduction with hydrogen and through carburization with carbon monoxide, for instance, the tungsten carbide is obtained with particle sizes of less than 1 $\mu$. The use of such particles in powder electrodes leads to various problems. On one hand, applying contacts is a problem, as it is impossible to make, with justifiable effort, a conducting grid or screen which is permeable to gas and has at the same time pores so fine that the catalyst particles do not pass into the gas space through the screen. On the other hand, the diameter of the pores which form between the particles also depend on the order of magnitude of the particles. High capillary pressures are developed in the narrow pores between small particles if the pores are filled with liquid. The development of a three-phase boundary can be achieved only by very high gas pressures.

In the case of bonded electrodes, these difficulties do not occur as in the manufacture of these electrodes through the application of pore forming materials, by known methods transport pores can be produced which are filled with gas even at low gas pressures and therefore make possible the transport of the reaction gas to the point of reaction. However, especially with high-performance electrodes, the application of organic binders can have a detrimental effect as the binders have insulating properties and therefore impede the conduction of the current. The binders, even entirely, exclude a portion of the particles from the conduction of the current and therefore from participation in the electrode process.

A method has already been proposed for the manufacture of an electrode containing tungsten carbide, wherein the WC catalyst particles are held together by silver. This electrode material is distinguished because of the favorable structure, by a high carrying capacity. The manufacture, however, is expensive.

It is an object of the invention to provide a method for the manufacture of an electrode material containing tungsten in powder form, in which the difficulties mentioned are not present and the stated shortcomings are avoided. In particular, the particle size of the powdered electrode material should not be too small, and the electrode material should meet the requirement of high conductivity.

According to the invention, this is achieved by imtimately mixing a tungsten compound in the form of a halide or oxide, a tungstic acid, a tungstate or a thiotungstate with a solid or liquid cokable organic substance or with a solution of this substance. The organic substance is precoked. Subsequently, by coking the organic substance and carburization and/or sulfidization of the tungsten compound, a catalyst with fine distribution is produced. The end product is pulverized. The precoking of the organic substance is completed at a temperature of about 300 to 400°C. The coking is accomplished as usual under the exclusion of oxygen, at temperatures of up to 1,000°C. The comminution of the end product is accomplished by known methods. Here the material is comminuted to form a powder of the desired grain size which is matched to the intended application.

In the method of the invention, carbon serves as the binding agent. It connects the fine catalytic particles to form larger particles. The carbon is formed by the coking of an organic substance during the manufacture of the electrode material. It is conductive, porous, uniformly mixed with the catalytic material and corrosion-resistant up to high anode potentials. It can, therefore, serve advantageously also for holding the material together and for the conduction of the current with catalytic materials of low conductivity such as tungsten disulfide.

The invention can be carried out in such a manner that the carburization or sulfidization, respectively, takes place along with the coking of the organic substance. Further carburization or sulfidization agents, respectively, such as carbon monoxide, hydrocarbons or hydrogen sulfide, respectively, can be added in the coking process.

To manufacture the electrode material in powder form, a tungsten compound is first mixed as homogeneously as possible with a carbonaceous substance and is then annealed in vacuum, in an inert gas, in an autoclave, in hydrogen or if desired also in an atmosphere of hydrocarbons or carbon monoxide or a mixture of these gases. The tungsten compounds principally used are oxides and halides, tungstic acids, tungstates and thiotungstates. Suitable organic substances are all carbon-containing substances which can be mixed uniformly or homogeneously with these tungsten compounds and which retain a carbon residue upon coking. Such substances can, advantageously, by carbohydrates such as sugar or starch and polymers such as polyvinylalcohol, polyacrylic acid, polyglycol, polyacrylonitrile, polyethylene and polyvinylidene chloride.

It is advantageous to prepare homogeneous melts or homogeneous solutions from the tungsten compound and the organic substance prior to the coking process. From the homogeneous solutions can be obtained, either by vaporization of the solvent or by joint precipitation, a homogeneous mixture of the two components. This mixture is first heated in air, in vacuum or in an inert gas, to about 300 to 400°C in order to precoke the organic substance. The greatest loss of weight takes place in the precoking, under intensive gas formation, the organic substance is decomposed into black products. At increased temperature, the coking process takes place subsequently where the precoked material is decomposed into elemental carbon, as well as the reduction of the tungsten compound, first into tungsten dioxide and then into tungsten, and finally, the carburization of the tungsten to form tungsten carbide. The reduction and carburization can here be carried out either as in the usual manufacture of active tungsten carbide, for instance from tungstic acid, by first heating the mixture in a hydrogen atmosphere to about 500°C, in order to reduce the tungsten compound to tungsten dioxide and subsequently at about 700°C to tungsten, and subsequently performing the carburization, for instance, by carbon monoxide at about 850°C.

The reduction and carburization of the tungsten compound can, however, also be carried out with the carbon compound directly in a single step in an inert gas, in vacuum or in an autoclave. As with this method, a particularly intimate mixing of the two components is necessary and preferably used in the case of solutions or melts. Finally, a further advantageous embodiment of the method according to the invention, is that the reduction of the tungsten compound is effected with hydrogen or another effective reducing agent and that the carburization takes place by the organic substance. Because tungsten and tungsten carbide recrystallize less readily than other tungsten compounds, the reduction is carried out at temperatures as low as possible. As hydrogen is a better reduction agent than the organic substance or its coking products, reduction with hydrogen leads to electrode materials with a particularly large surface.

Tungsten disulfide can be embedded in a carbon skeleton in a corresponding manner. For this purpose thiotungstate is either selected as the starting compound or sulfidization in the presence of hydrogen sulfide is carried out.

Direct reduction and carburization or sulfidization, respectively, is facilitated by the carbon compound in an intimate mixture of the organic substance with the tungsten compound An intimate mixture is obtained, for instance, through joint precipitation of sodium tungstate and polyvinylalcohol from an aqueous solution with hydrochloric acid. Due to the intimate mixture, the reaction temperatures are simultaneously reduced and recrystallization of the intermediate reaction products can, thereby, be limited. In this manner, one obtains highly reactive products with a particularly large active surface. This constitutes a further advantage of the method according to the invention for the manufacture of electrode material in powder form. When in the manufacture of the electrode material, the respective carburization or sulfidization temperature, is reached, the coking has also progressed to the point where the carbon acting as the binding agent has reached sufficient conductivity to assure good current conduction. The conductivity of a coking product of polyacrylonitrile prepared at 800°C is for instance 0.035/Ω·cm.

In the manufacture of the electrode material in powder form containing tungsten, so much organic substance is advantageously added to the tungsten compound that the final product contains 5 to 50 percent by weight of free carbon, referred to the tungsten carbide or tungsten disulfide, respectively. In setting the weight ratios, it should be taken into consideration that not all the carbon contained in the organic substance remains in the final product. Part is lost as volatile compounds, such as tar. The quantity of carbon in the final product can be determined either analytically or by recording a thermogram. In the coking of sugar, for instance, 30 percent by weight of the organic substance remains in the residue as carbon, in the case of starch, 10 percent, in the case of polyvinylalcohol or polyacrylic acid, 15 percent.

The porosity of the powdered electrode material prepared according to the invention, can advantageously be improved by adding to the mixture of the tungsten compound and the organic substance chemical activating agents such as zinc chloride, potassium sulfide, potassium thiocyanate, phosphoric acid, sulfuric acid, alkali hydroxides, magnesium chloride or calcium chloride. These activating agents limit the formation of tar to a minimum and aid in the development of a highly porous structure, i.e. the formation of carbon with a large surface. After the electrode material is manufactured, the activating agents are dissolved out. This elimination process may not be necessary if the activating agent escapes directly in the preparation of the electrode at elevated temperature, such as for instance, zinc chloride.

After the end product is comminuted, for instance by milling, a suitable grain fraction is screened out and the finished electrode material is built into a powder electrode. With the electrode material manufactured according to the invention, the manufacture of large-area electrodes, however, is also possible. For this purpose, the starting mixture of the tungsten compound and the organic substance is first fabricated into a film or a thin layer and then subjected to the coking and catalyst forming process described. The development of transport pores is assured by the admixture of pore forming materials, if necessary. It is easier to apply contacts to a large-area electrode of this kind than to a powder electrode.

The invention will be explained in more detail with the aid of several examples of embodiments.

EXAMPLE 1 a. Preparation of the electrode material in powder form:

5 g of glucose and 5 g of tungstic acid were made into a suspension with water, dried on a sand bath and the organic substance precoked at about 300°C. The product obtained in this manner is then comminuted, placed in a quartz boat in a thin layer and is heated in a tubular furnace for 4 hours in vacuum at about 900°C. The electrode material produced is comminuted, whereafter, a grain fraction with a particle size below the 50 $\mu$ is screened out. According to an x-ray analysis the finished end product contains, in addition to carbon, tungsten carbide WC and some $\alpha$-$W_2C$.

b. Preparation of an electrode and recording of the characteristics:

The characteristics are recorded in the well-known half-cell arrangement according to the principle of the supported electrodes. Here 250 mg of the electrode material are applied as a thin layer of powder by sedimentation on a round diaphragm, i.e. an asbestos paper cover layer with an area of 12.5 cm$^2$. This corresponds to surface coating of about 20 mg/cm$^2$. In this connection it has been found advantageous to treat the electrode material prior to sedimentation first with ultrasonics in the sedimentation liquid, in order to separate the individual particles from each other and to improve wetting. The cover layer is supported on the electrolyte side by a perforated tantalum sheet. On the gas side, a carbon fabric and a further, gold-plated perforated tantalum sheet serve to support and make contact with the electrode material. At 67°C and a hydrogen pressure of 0.2 newtons/mm$^2$ (approximately 2.0 atm.), the electrodes deliver, with 300 mV overvoltage, a current of 58 mA, corresponding to 4.6 mA/cm$^2$ or 230 mA/g.

EXAMPLE 2

5 g of glucose and 5 g of tungstic acid were thoroughly ground together in a mortar and precooked in an Al$_2$O$_3$ ceramic crucible in a muffle furnace at about 300°C in nitrogen. The product obtained is comminuted, spread in a boat in a thin layer and is first reduced in a tubular furnace for 17 hours at about 500°C in hydrogen and finally carburized for 6 hours at about 860°C with carbon monoxide, the coking process taking place at the same time.

The electrode material is comminuted as in Example 1, screened and built into an electrode. At 60°C, a pressure of 0.2 Newtons/mm$^2$ (approximately 2.0 atm.) and with an overvoltage of 300 mV, this electrode delivers 475 mA or 38 mA/cm$^2$. The surface coating was only 20 mg/cm$^2$ as in Example 1. From this a current of 1.9 A/g is obtained.

EXAMPLE 3

As a control experiment, 30 g of tungstic acid are spread out in a quartz boat and reduced in a tubular furnace in a hydrogen stream in the well known manner, first for 5 hours at 500°C and subsequently for 5 hours at 700°C. The tungstic acid is thereby reduced in the first step to tungsten dioxide, and in the second step to metallic tungsten. After the termination of the reduction, carbon monoxide is fed through the quartz tube of the tubular furnace in place of hydrogen and the furnace is heated to 860°C for 6 hours. After the tube has cooled, the carbon monoxide stream can be turned off and the electrode material can be removed, which in this case consists of only the WC catalyst. As in Example 1, the powder is formed into an electrode and delivers under the same conditions only 3.0 mA/cm$^2$. If the coating is doubled, i.e. with 40 mg of electrode material per cm$^2$, the capacity of the electrode does not increase further. On the contrary, the loading drops to less than 2 mA/cm$^2$. Because of the lack of wide gas transport pores, the WC catalytic material can be utilized the more poorly, the thicker the electrode.

EXAMPLE 4

3.3 g of sodium tungstate are dissolved in 20 ml of water. The solution is carefully added to 32 ml of a 5 percent polyvinylalcohol solution. The mixture is heated and reacted drop by drop with 20 ml of 1 n HCl. When this addition is completed and the precipitate that may have occurred is redissolved out, the mixture is allowed to cool and is poured into 50 ml of concentrated HCl. A mixture of polyvinylalcohol and tungstic acid is thereby precipitated. The precipitate is separated from the liquid, is dried at room temperature and is pulverized. The powder is heated in a tubular furnace at a heating rate of 0.5°C/min to 300°C, is removed from the furnace and comminuted. Subsequently, the powder is placed in the furnace again and heated in a hydrogen stream to 500°C and kept at this temperature for 6 hours. Subsequently, the heat is increased within an hour to 850°C and the temperature is kept at this value for 2 hours. After cooling, the product is comminuted and the powder is built into an electrode as in Example 1b. For a coating with 20 mg/cm$^2$ the electrode delivers, at a hydrogen pressure of 0.2 Newtons/mm$^2$ (approximately 2 atm) and a temperature of 60°C, 5.8 mA/cm$^2$ with a polarization of 300 mV. With a coating of 100 mg/cm$^2$, one obtains under the same conditions 24 mA/cm$^2$.

EXAMPLE 5

3.3 g of sodium tungstate are dissolved in 10 ml of water and are mixed with 32 ml of a 5 percent solution of polyvinylalcohol in water. The mixture is acidified in hot condition with 20 ml of 1 n HCl drop by drop while being stirred and is subsequently precipitated by pouring it into 50 ml of concentrated HCl. The precipitate is filtered, dried at 80°C and pulverized. The powder is then spread out in a thin layer in a quartz boat and is heated in a tubular furnace to 200°C in a hydrogen stream. Subsequently, the heat is increased in the temperature range between 200 and 500°C at a heating rate of 30°C/hr. The temperature is then kept at 500°C for 6 hours. Finally, the temperature is increased within 1 hour from 500 to 850°C. After the temperature of 850°C is reached, carbon monoxide is passed over the sample in the place of hydrogen. The temperature of 850°C is then kept constant for 2 hours, and subsequently, the sample is allowed to cool in an atmosphere of carbon monoxide. The finished catalytic material is treated as in Example 1 and built into an electrode. Under the conditions corresponding to Example 1 one obtains with this electrode a current density of 5.5 mA/cm$^2$ or 275 mA/g. This electrode was then placed into an electrode mount for a gas diffusion electrode and the gas space of the electrode mount was filled with electrolytic liquid so that the electrode was flooded. In the flooded condition the electrode was potential-stabilized without supply of hydrogen for 3 hours at a potential of 800 mV, measured against a reversible hydrogen electrode. Under the same conditions as before, the electrode subsequently yielded a current density of 9.3 mA/cm$^2$ or 465 mA/g.

EXAMPLE 6

A solution of 3.3 g of sodium tungstate in 20 ml of water is mixed with a solution of 12.5 g of starch in 20 ml of water. To this solution 5 ml of formic acid and 2.0 g of magnesium chloride in 10 ml of water are added. The solution is dried and the dried product ground in a mortar. The comminuted product is then first precoked at about 300°C and subsequently heated in vacuum for 4 hours at 900°C and for 1 hour at 1,000°C. The electrode material obtained thereby is further treated as described in Example 1a and an electrode is made therefrom according to Example 1b. The magnesium chloride is removed from the electrode material by washing with water, prior to forming the electrode. The electrode delivers under the same conditions as in Example 1b a current density of 8.7 mA/cm² or 435 mA/g.

EXAMPLE 7

A solution of 3.3 g of sodium tungstate in 20 ml of water is mixed with a solution of 1.2 g of starch in 10 ml of water. To this mixture is added successively 5 ml of formic acid and a solution of 2.5 g of zinc chloride in 10 ml of water. The homogeneous solution obtained thereby is dried and heated in argon as the protective gas with a heating rate of 1°C/min to 400°C and subsequently at a heating rate of 5°C/min to a temperature of 900°C. After reaching the maximum temperature the protective gas is replaced by hydrogen sulfide and the temperature maintained at this value for 2 hours. The hydrogen sulfide is then removed and the sample is allowed to cool in argon. An electrode prepared according to Example 1 yields, under the conditions stated there, a current density of 1.8 mA/cm² or 90 mA/g, with a polarization of 200 mV.

EXAMPLE 8

5 g of water containing tungstic acid are dissolved in 50 ml of ammonia and 10 ml of water. The solution is saturated with hydrogen sulfide within 4 to 5 hours and subsequently mixed with a solution of 2.5 g of starch in 10 ml of water. The solution obtained thereby is dried and, with argon as the protective gas, is first heated at a rate of 1°C/min to 350°C and then, with a rate of 5°C/min. to 950°C. An electrode prepared as in Example 1 yields under the conditions stated there, with a polarization of 200 mV, a current density of 1 mA/cm² or 50 mA/g.

What is claimed is:

1. A method for the manufacture of powdered form tungsten containing and free carbon containing electrode material for electrochemical cells, particularly fuel cells, which comprises intimately mixing tungsten compound selected from tungsten halide, tungsten oxide, tungstic acid, tungstate, thiotungstate with a solid or liquid cokable organic substance or a solution thereof, then heating the mixture to about 300 to 400°C. thereby to precoke the organic substance in the mixture, thereafter heating the mixture in the presence of hydrogen to about 500°C. and subsequently heating the mixture to temperatures in the range of 700 to 1,000°C. thereby to coke the organic substance and carburizating the tungsten compound in said temperature range to produce an end product and pulverizing the end product to yield a finely distributed catalyst.

2. The method of claim 1, wherein the heating rate is within the range of 0.5 to 10°C/min and the temperature is kept at the final temperature until completion of the carburization.

3. The method of claim 1, wherein a chemical activating agent selected from zinc chloride, potassium sulfide, potassium thiocyanate, phosphoric acid, sulfuric acid, alkali hydroxide, magnesium chloride and calcium chloride is added to the mixture of tungsten compound and cokable organic substance to provide an increased porosity in the finished product.

4. The method of claim 3, wherein zinc chloride is added.

5. The method of claim 3, wherein magnesium chloride is added.

6. A method for the manufacture of powdered form tungsten carbide containing and free carbon containing electrode material for electrochemical cells, particularly fuel cells, which comprises mixing an aqueons solution of an alkali tungstate with with an aqueons solution of an organic polymer, adding an acid to the mixture thereby to precipitate a mixture of tungstic acid and the organic polymer, drying the precipitate, then precoking the organic polymer in the mixture thereof with the tungstic acid subsequently heating the mixture of the precoked organic polymer and the tungstic acid under the exclusion of air to 700 to 1,000°C. thereby to coke the precoked organic polymer and carburizate the tungsten into tungsten carbide and pulverizing the product of the coking and carburizating step to yield a finely distributed catalyst.

7. The method of claim 6, wherein the temperature for the coking and the carburizating is 950°C.

8. A method for the manufacture of powdered form tungsten carbide containing and free carbon containing electrode material for electrochemical cells, particularly fuel cells, which comprises mixing an aqueons solution of an organic substance, drying the mixture, precoking the organic substance in the dried mixture, then heating the mixture in an atmosphere of hydrogen to about 850°C, subsequently heating the mixture in an atmosphere of carbon monoxide at a temperature of about 850°C. thereby to coke the precoked organic substance and carburizate the tungsten into tungsten carbide and pulverizing the product of the coking and carburizating step to yield a finely distrubuted catalyst.

9. The method of claim 8, wherein the aqueous solution of alkali tungstate and organic substance are precipitated, by addition of an acid, to a mixture of tungsten acid and the organic substance which is then dried, first heated under hydrogen and subsequently under carbon monoxide.

10. A method for the manufacture of powdered form tungsten containing and free carbon containing electrode material for electrochemical cells, particularly fuel cells, which comprises intimately mixing tungsten compound selected from tungsten halide, tungsten oxide, tungstic acid, tungstate, thiotungstate with a solid or liquid cokable substance or a solution thereof, then precoking the organic substance in the mixture, subsequently coking the organic substance while carburizating the tungsten to form an end product containing tungsten carbide, the cokable substance having been mixed with the tungsten compound in such proportion that the end product contains 5 to 50 percent by weight of free carbon, based on the tungsten compound, and pulverizing the end product to yield a finely distributed catalyst.

11. A method for the manufacture of powdered form tungsten containing and free carbon containing electrode material for electrochemical cells, particularly fuel cells, which comprises intimately mixing tungsten compound selected from tungsten halide, tungsten oxide, tungstic acid, tungstate, thiotungstate with a solid or liquid cokable substance or a solution thereof, then precoking the organic substance in the mixture, subsequently coking the organic substance while sulfidizing the tungsten compound to produce an end product and pulverizing the end product to yield a finely distrubuted catalyst.

12. The method of claim 11, wherein the precoking of the organic substance in the mixture comprises heating the mixture to about 300 to 400°C., the coking and sulfidizing are carried out at temperatures in the range of 700 to 100°C, and further comprising the step, intermediate the precoking step and the coking and sulfidizing steps, of heating the mixture in the presence of hydrogen to about 500°C.

13. The method of claim 11, wherein a chemical activating agent selected from zinc chloride, potassium sulfide, potassium thiocyanate, phosphoric acid, sulfuric acid, alkali hydroxide, magnesium chloride and calcium chloride is added to the mixture of tungsten compound and cokable organic substance to provide an increased porosity in the finished product.

14. The method of claim 11, wherein so much of organic substance, particularly a carbohydrate or a polymer, is added to the mixture that the end product contains 5 to 50 percent by weight of free carbon, based on the tungsten compound.

15. A method for the manufacture of powdered form tungsten disulfide containing and free carbon containing electrode material for electrochemical cells, particularly fuel cells which comprises mixing an aqueous solution of an alkali tungstate with an aqueous solution of an organic substance, drying the mixture, precoking the organic substance in the dried mixture, then heating the mixture in an atmosphere of hydrogen sulfide to 700 to 1,000°C. thereby to coke the prcoked organic substance and sulfide the tungsten into tungsten disulfide and pulverizing the product of the coking and sulfidizing step to yield a finely distributed catalyst.

16. The method of claim 15, wherein the heating for the coking and the sulfidizing is to 900°C.

17. A method for the manufacture of powdered form tungsten disulfide containing and free carbon containing electrode material for electrochemical cells, particularly fuel cells, which comprises mixing an aqueous solution of ammonia thiotungstate with an aqueous solution of an organic substance, drying the mixture, precoking the organic substance in the dried mixture, then heating the mixture in a protective gas atmosphere to 700 to 1,000°C. thereby to coke the precoked organic substance and sulfidize the tungsten into tungsten disulfide and pulverizing the product of the coking and sulfidizing step to yield a finely distributed catalyst.

18. The method of claim 7, wherein the mixture is heated to 950°C for the coking and the sulfidizing.

* * * * *